Patented Aug. 29, 1950

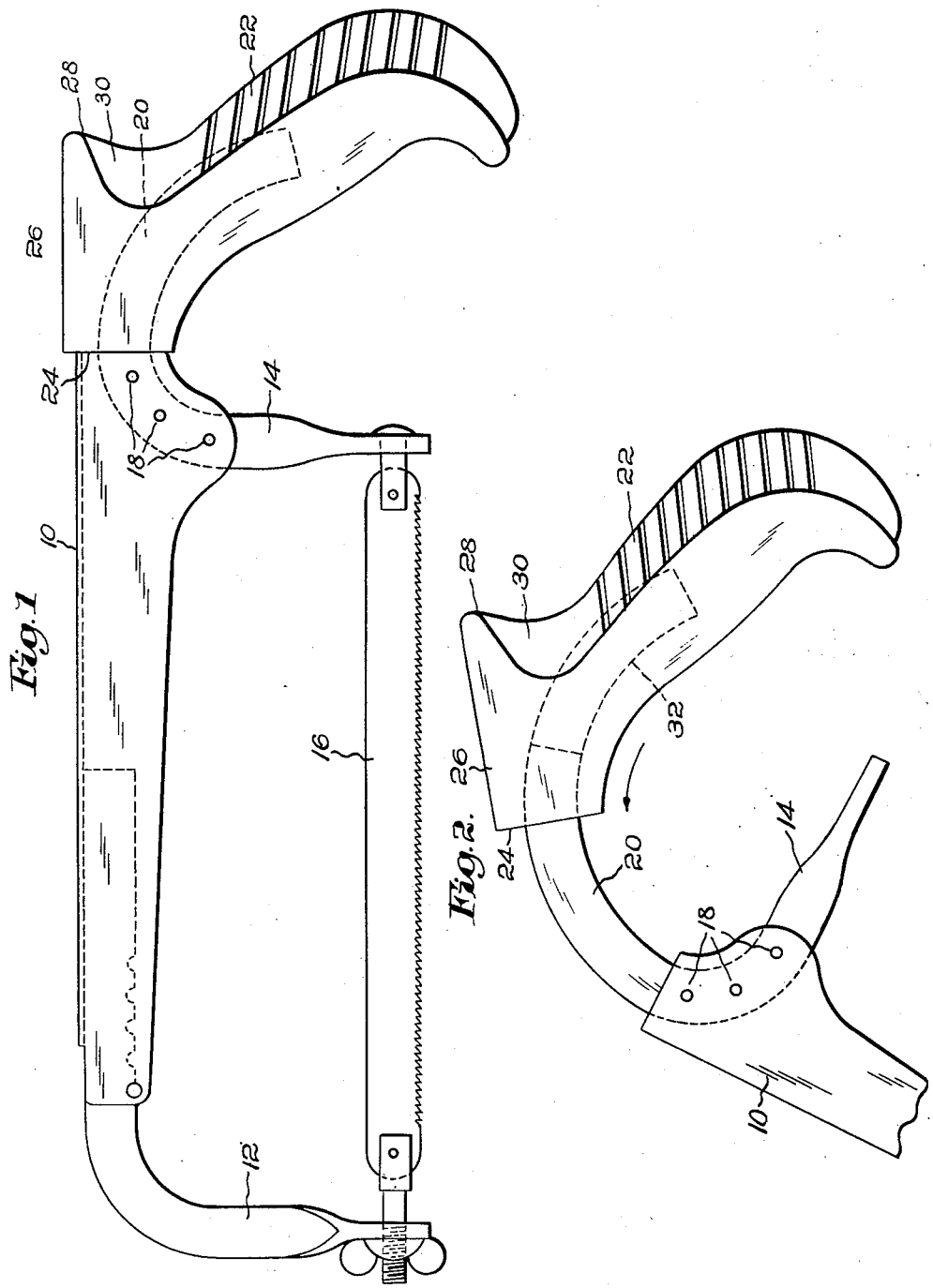

2,520,890

UNITED STATES PATENT OFFICE 2,520,890

SAW FRAME

Dwight E. Priest, Southboro, Mass., assignor to Parker Manufacturing Company, Worcester, Mass., a corporation of Massachusetts Application July 2, 1946, Serial No. 681,105

1 Claim. (Cl. 145—33)

This invention relates to saw frames and the object is to provide a frame embodying a desirable type of hand grip and so constructed as to permit the grip to be preformed as a unit by an inexpensive molding process and to be incorporated with the rest of the frame by a simple assembling operation in contradistinction to the common practice of molding it in situ on the frame from uncured plastic and curing it thereon.

My invention will be well understood by reference to the following description of the illustrative embodiment thereof shown by way of example in the accompanying drawing, wherein:

Fig. 1 is a side view of a saw frame; and

Fig. 2 is a fragmentary view illustrating an initial stage of the assembling step.

Referring to Fig. 1 of the drawing, the saw frame there disclosed has a back 10 in the form of a downwardly facing channel. The forward adjustable arm 12 is slidably associated with the channel in known manner and the rear arm 14 projects downwardly adjacent the rear end of the channel, the blade 16 being stretched in any desired manner between these arms. Herein the rear arm is a part of a member secured by rivets 18 between the flanges of the channel and extending from the rear end of the channel to provide a tang 20 on which the handle grip 22 is mounted. The grip 22 is shown as of known contour and is of the so-called pistol type and it will be seen that the vertical end surface 24 thereof which faces toward the left in Fig. 1 abuts against the rear end surfaces of both the web and the flanges of the channel and that the upper end portion of the grip has a closed or unbroken top surface 26 at the rear of the web of the channel, preferably extending slightly above the exterior line of the same. That is, the grip 22 completely surrounds the tang 20. The upper portion of the grip adjacent the top edge 26 may also have a rearward extension 28 providing a portion which in use overlies the dorsal surface of the grasping hand between the thumb and index finger and defines a concave seat portion or sinus 30 to receive the web of the hand which extends between said fingers.

A grip as described is desirable both for reasons of practical efficiency and for reasons of appearance, but as hitherto provided it has been molded directly on the frame from uncured raw plastic.

In my construction as illustrated the tang 20 where it projects rearwardly from the interior of the channel 10 is a smooth, downwardly descending curve which desirably may extend for substantially a quadrant of the circle. The grip 22 is preformed, being molded as a separate unit from suitable material, as, for instance, a rather firm rubber compound, of considerable hardness although not what would be termed ebonite, and it has formed therein a recess 32 (see Fig. 2) opening from the end surface 24, circularly curved like the tang 20 and of no greater cross-sectional dimension. In practice at least one dimension may be somewhat less than the corresponding dimension of the tang and good results have been obtained with a handle formed of reclaimed rubber in which the recess 32 was about .015 of an inch narrower than the tang but of the same nominal thickness. Such a handle may be heated to about 150° F. for approximately twenty minutes and will thus be slightly expanded, permitting it to be forced on over the tang. The beginning of such an assembling movement is shown in Fig. 2. As the grip cools, it shrinks into a firm mechanical gripping relation to the tang.

The curved tang 32 as shown may be long although received within a grip 22 of restricted fore and aft dimension. Its curved form which disposes its distal end portion substantially at right angles to the line of pull provides a secure connection with substantially no tendency for the grip to pull off in use. It will be clear from Fig. 2 that the reverse of the assembling movement would be a clockwise rotation, whereas an inspection of Fig. 1 will show that the strains on the grip when the saw is in use are exerted rather in a counterclockwise direction. There is no straight line engagement of the tang with the grip along which a component of a force exerted parallel to the blade could develop a slipping movement.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claim to indicate those principles of the invention exemplified by the particular embodiment described and which I desire to secure by Letters Patent.

I claim:

A saw frame comprising a back in the form of a downwardly facing channel, a member secured between the flanges of said channel and having a portion curved in a downwardly directed circular arc throughout its length projecting from an end of the channel to provide a tang, and a grip having an end surface disposed, when in position, transversely to the length of the channel and extending upwardly at least to the line of its back surface, said grip having a recess opening from said surface circularly curved to correspond to the curvature of the tang and closely approximating the cross-sectional dimensions of the tang whereby it may be slid over the tang completely to receive the same in tightly gripping relation, the outer surfaces of the web and flanges of the channel continuing rearwardly unbroken at least to said end surface of the grip.

DWIGHT E. PRIEST.

REFERENCES CITED

The following references are of record in the file of this patent:

UNITED STATES PATENTS

| Number | Name | Date |
|--------|------|------|
| Re. 20,252 | Priest | Jan. 26, 1937 |